United States Patent
Chen et al.

(10) Patent No.: US 11,042,630 B2
(45) Date of Patent: Jun. 22, 2021

(54) DYNAMIC PAGE SIMILARITY MEASUREMENT

(71) Applicant: Trend Micro Incorporated, Tokyo (JP)

(72) Inventors: Chao-Yu Chen, Taipei (TW); Peng-Shih Pu, Taipei (TW); Yu-Fang Tsai, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 16/548,269

(22) Filed: Aug. 22, 2019

(65) Prior Publication Data

US 2020/0042696 A1 Feb. 6, 2020

Related U.S. Application Data

(63) Continuation of application No. 11/617,654, filed on Dec. 28, 2006, now abandoned.

(51) Int. Cl.
*H04L 29/06* (2006.01)
*G06F 21/51* (2013.01)
*G06F 16/23* (2019.01)
*G06F 16/248* (2019.01)

(52) U.S. Cl.
CPC ............ *G06F 21/51* (2013.01); *G06F 16/235* (2019.01); *G06F 16/248* (2019.01); *H04L 63/1483* (2013.01); *G06F 2221/2119* (2013.01)

(58) Field of Classification Search
CPC ...................... H04L 63/1483; G06F 2221/2119
See application file for complete search history.

(56) References Cited

U.S. PATENT DOCUMENTS

| | | | | |
|---|---|---|---|---|
| 7,457,823 B2* | 11/2008 | Shraim | ................... | H04L 51/12 |
| 7,630,987 B1* | 12/2009 | Renfro | ................ | H04L 63/1483 |
| 7,913,302 B2* | 3/2011 | Shraim | ............... | H04L 63/1483 |
| | | | | 726/22 |
| 7,992,204 B2* | 8/2011 | Shraim | ............... | H04L 63/1483 |
| | | | | 726/22 |
| 8,041,769 B2* | 10/2011 | Shraim | ............... | H04L 63/1491 |
| | | | | 709/206 |
| 8,205,255 B2* | 6/2012 | Benea | ..................... | G06F 21/64 |
| | | | | 713/194 |
| 8,745,151 B2* | 6/2014 | Rowley | ............... | G06F 21/6209 |
| | | | | 709/217 |

(Continued)

*Primary Examiner* — Shen Shiau
(74) *Attorney, Agent, or Firm* — Okamoto & Benedicto LLP

(57) ABSTRACT

A method for determining which web page among multiple candidate web pages is similar to a given web page. For each candidate web page, a set of scoring rules is provided to score the components therein. When the given web page is compared against a candidate web page, each component that is found in both the given web page and the candidate web page under examination is given a score in accordance with the set of scoring rules that is specific to that web page under examination. A composite similarity score is computed for each comparison between the given webpage and a candidate web page. If the composite similarity score exceeds a predefined threshold value for a comparison between the given webpage and a candidate web page, that candidate web page is deemed the web page that is similar.

17 Claims, 3 Drawing Sheets

(56) References Cited

U.S. PATENT DOCUMENTS

| | | | | |
|---|---|---|---|---|
| 8,850,570 B1* | 9/2014 | Ramzan | H04L 63/145 | 726/22 |
| 8,943,588 B1* | 1/2015 | Speegle | H04L 63/1483 | 726/22 |
| 2004/0123157 A1* | 6/2004 | Alagna | H04L 63/1466 | 726/8 |
| 2006/0069697 A1* | 3/2006 | Shraim | H04L 63/1425 | |
| 2006/0080735 A1* | 4/2006 | Brinson | G06F 21/554 | 726/22 |
| 2006/0123478 A1* | 6/2006 | Rehfuss | H04L 63/1408 | 726/22 |
| 2006/0179315 A1* | 8/2006 | Sasage | H04L 67/02 | 713/173 |
| 2006/0253584 A1* | 11/2006 | Dixon | H04L 67/02 | 709/225 |
| 2007/0107053 A1* | 5/2007 | Shraim | H04L 63/1483 | 726/22 |
| 2007/0192853 A1* | 8/2007 | Shraim | H04L 63/1483 | 726/22 |
| 2007/0294352 A1* | 12/2007 | Shraim | H04L 63/1491 | 709/206 |
| 2007/0294762 A1* | 12/2007 | Shraim | H04L 63/1491 | 726/22 |
| 2007/0299777 A1* | 12/2007 | Shraim | H04L 63/1441 | 705/51 |
| 2008/0010683 A1* | 1/2008 | Baddour | G06F 16/951 | 726/24 |
| 2008/0034073 A1* | 2/2008 | McCloy | H04L 63/168 | 709/223 |
| 2008/0046738 A1* | 2/2008 | Galloway | H04L 63/1416 | 713/176 |
| 2008/0092242 A1* | 4/2008 | Rowley | H04L 61/30 | 726/27 |
| 2008/0115214 A1* | 5/2008 | Rowley | G06F 21/6209 | 726/22 |
| 2008/0162449 A1* | 7/2008 | Chao-Yu | G06F 21/51 | |
| 2008/0163369 A1* | 7/2008 | Chang | H04L 63/1416 | 726/22 |
| 2008/0172741 A1* | 7/2008 | Reumann | H04L 63/1483 | 726/23 |
| 2009/0282479 A1* | 11/2009 | Smith | H04L 63/1483 | 726/22 |
| 2010/0186088 A1* | 7/2010 | Banerjee | H04L 63/1441 | 726/23 |
| 2014/0359760 A1* | 12/2014 | Gupta | H04L 63/1408 | 726/22 |
| 2020/0045067 A1* | 2/2020 | Chang | G06F 21/51 | |

* cited by examiner

DYNAMIC PAGE SIMILARITY MEASUREMENT

CROSS-REFERENCE TO RELATED APPLICATION(S)

The present application is a continuation of U.S. patent application Ser. No. 11/617,654, filed Dec. 28, 2006, entitled "Dynamic Page Similarity Measurement," the disclosure of which is hereby incorporated by reference.

BACKGROUND OF THE INVENTION

Phishing represents a fraudulent technique employed to obtain confidential transaction information (such as user name, password, financial information, credit card information, etc.) from computer users for misuse. In phishing, the phisher employs a phishing server to send an apparently official electronic communication (such as an official looking email) to the victim. For example, if a phisher wishes to obtain confidential information to access a victim's account at XYZ bank, the email would typically come from an XYZ bank email address and contain official-looking logos and language to deceive the victim into believing that the email is legitimate.

Further, the phisher's email typically includes language urging the victim to access the website of XYZ bank in order to verify some information or to confirm some transaction. The email also typically includes a link for use by the victim to supposedly access the website of XYZ bank. However, when the victim clicks on the link included in the email, the victim is taken instead to a sham website set up in advance by the phisher. The sham website, referred to herein as the phishing website, would then ask for confidential information from the victim. Since the victim had been told in advance that the purpose of clicking on the link is to verify some account information or to confirm some transaction, many victims unquestioningly enter the requested information. Once the confidential information is collected by the phisher, the phisher can subsequently employ the information to perpetrate fraud on the victim by stealing money from the victim's account, by purchasing goods using the account funds, etc.

FIG. 1 illustrates an example of a phishing attack. In FIG. 1, a phisher 102 (typically an email server that is under control of a human phisher) sends an official-looking email 104 designed to convince a recipient 108 that the email is sent by a legitimate business, such as by bank 106. The email may, for example, attempt to convince the recipient 108 to update his account by clicking on an attached link to access a web page. If the recipient 108 clicks on the link, the web page that opens would then request the user to enter the user's confidential information such as userid, password, account number, etc.

However, since the web page did not come from the legitimate business 106, the user's confidential information is sent (110) the user's confidential information to a phishing website 112. Phishing website 112 then collects the user's confidential information to allow the phisher to perpetrate fraud on the user.

Because phishers actually divert the victim to another website other than the website of the legitimate business that the victim intended to visit, some knowledgeable users may be able to spot the difference in the website domain names and may become alert to the possibility that a phishing attack is being attempted. For example, if a victim is taken to a website whose domain name "http://218.246.224.203/icons/cgi-bin/xyzbank/login.php" appears in the browser's URL address bar, that victim may be alert to the fact that the phisher's website URL address as shown on the browser's URL toolbar is different from the usual "http://www.xyzbank.com/us/cgi-bin/login.php" and may refuse to furnish the confidential information out of suspicion. However, it is known that many users are not sophisticated or always vigilant against phishing attempts. Accordingly, relying on users to stay on guard against phishing attempts has proven to be an inadequate response to the phishing problem.

SUMMARY OF INVENTION

The invention relates, in an embodiment, to a computer-implemented method for ascertaining which web page among a plurality of candidate web pages is similar to a given web page. The method includes extracting a set of web page components from the given web page. The method also includes comparing the given web page against each of the plurality of candidate web pages in turn. The comparing results in a composite similarity score for the set of web page components. The composite similarity score is computed from scores assigned to individual ones of the set of web page components in accordance with a set of scoring rules associated with the web page that is under examination for similarity, wherein a web page component of the set of web page components is associated with a first score if the web page component also exists in the web page that is under examination for similarity. The web page component of the set of web page components is associated with second score different from the first web page component if the web page component does not exists in the web page that is under examination for similarity. If the composite similarity score exceeds a predefined threshold, the method also includes designating the given web page similar to the web page that is under examination for similarity.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
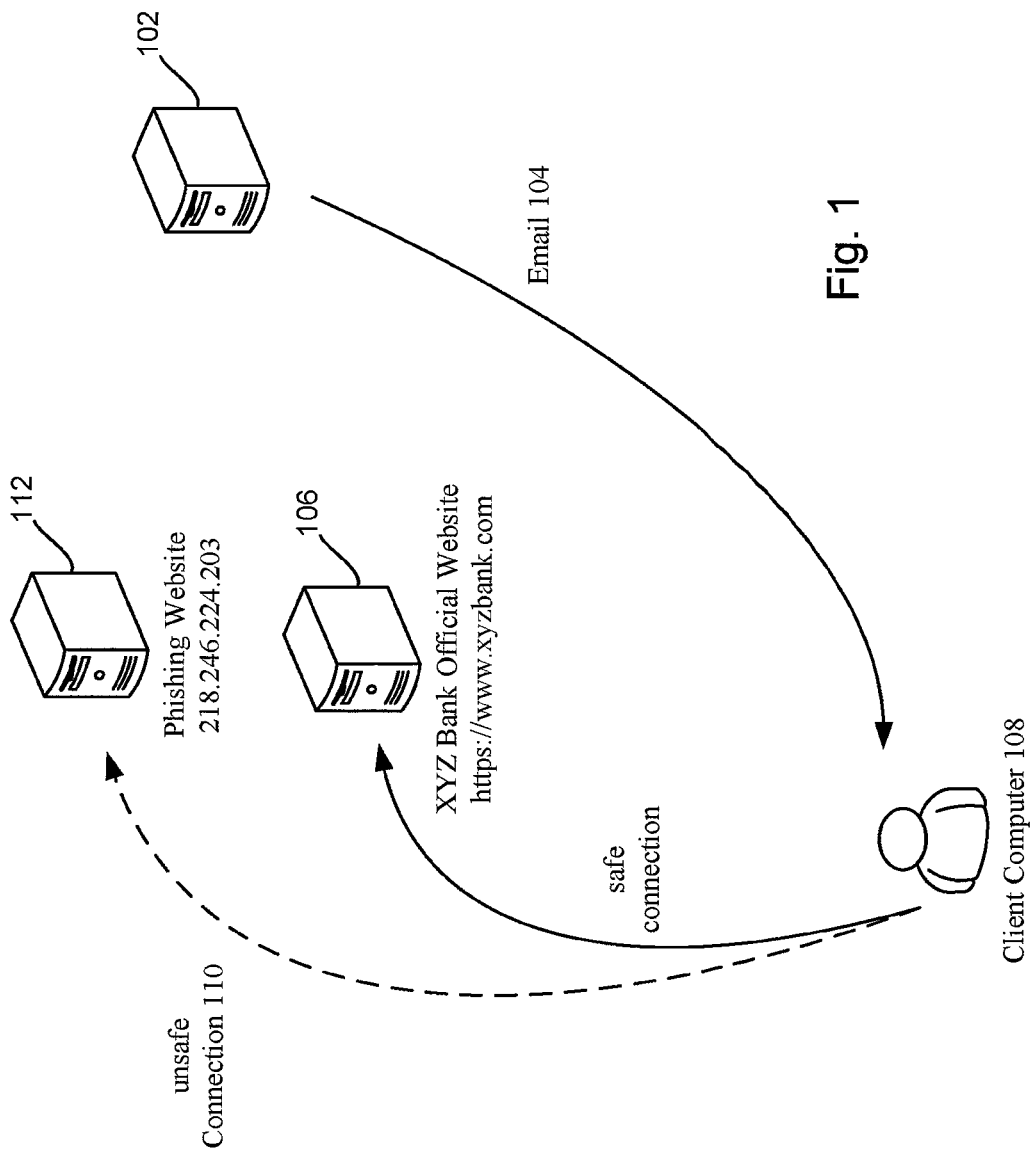
FIG. 1 illustrates an example of a phishing attack.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Since the purpose of a phishing web page is divert the user input information to a website controlled by the phisher, this fact provides a possible approach to detect whether a particular web page is being used in attempting to commit phishing fraud. If the counterpart legitimate web page can be determined, it is possible then to determine whether the transaction information destination (i.e., the location that the respective web pages specify for user input data to be sent) would be the same for both the legitimate web page and for the suspect web page (e.g., one under investigation to ascertain whether that web page is attempting to commit a phishing fraud). If the transaction information destinations are different for the two web pages, that difference is an indication that a phishing fraud may be underway.

The aforementioned approach would be operative only if, however, the identity of the counterpart legitimate web page can be ascertained from the suspect web page. Ascertaining whether a given web page is sufficiently similar to a suspect web page such that the given web page is likely the counterpart legitimate web page that the suspect web page is attempting to emulate is a subject of the present invention herein.

In accordance with embodiments of the present invention, there are provided methods and apparatus for dynamically ascertaining whether a given web page is sufficiently similar to a suspect web page such that the given web page is likely the counterpart legitimate web page that the suspect web page is attempting to emulate. Since there are potentially billions of web pages in existence today, it would be impractical to test a suspect web page against every web page in existence to determine whether they are similar. Even if there is sufficient computing power to do so, the amount of time required to make such a similarity determination would render the technique impractical in use.

The inventors herein realize, however, that given the scope of the phishing problem, the set of web pages to be tested for similarity against a suspect web page is substantially smaller and more manageable than the set of all available web pages. It is reasoned that the majority of phishing attempts will be focused on a few types of web page, including those that collect transaction information from the user for example. Accordingly, web pages that merely implement static presentations of data do not present the same degree of phishing risk as a web page that collects, for example, the user's login data, the user's financial data, or any of the user's personal, financial, and/or confidential data.

Furthermore, it is reasoned that the majority of phishing attempts would also be focused on a certain known types of website. For example, the large majority of phishing attempts will be motivated by financial fraud, and thus the target websites are likely to be found among financial institution sites (such as banks, on-line trading accounts, online payment accounts), shopping sites (such as sites that allow the user to purchase goods and have the goods shipped to a particular address upon entering the user's financial and/or login data), and generally any website that provides goods and/or services upon the user's presentation of authenticating and/or financial/personal data.

Of these websites, it is reasoned that a large majority of phishing attempts will again be focused on those that are most popular since the user whom the phisher is attempting to deceive would more likely have an account at a popular online store versus a relatively obscure online store. By progressively narrowing down the set of possible target websites and web pages, the number of web pages to be tested for similarity against a suspect phishing web page can be kept manageably small for computational purposes. Even by focusing only on the top dozens or hundreds of target websites and web pages (which may be identified by performing a study of past phishing attempts for example), it is possible to provide a heightened level of protection against phishing via the ability to identify the target web page for a large majority of the time, and to determine whether their transaction information destinations are the same.

The inventors herein also provide techniques to efficiently test a particular potential target web page for similarity with a suspect web page. In accordance with an embodiment of the invention, each likely target web page is associated with a set of scoring rules (which may comprise one or more scoring rules) for scoring features of that target web page if those same features are found on the suspect web page.

To elaborate, each web page may be thought of as a combination of features. These features may include visible characteristics or attributes, such as the color, location, and size of its images or textual information. These features may also include background characteristics or attributes that are not necessarily visible to a user. For example, some portion of many web pages may be formed using code that is largely invisible to the user but nevertheless contributes to the transmission, generation, and/or operation of the web page. Examples of these features include the URL strings specifying the destination for the user-input transaction information, HTML strings or other codes to perform computations, etc Since the set of likely target web pages are limited in number given the scope of the phishing problem, it is possible to manually (i.e., performed by a human) or automatically (i.e., performed in an automated manner using software) generate rules for scoring features of a particular target web page.

For example, the login page of XYZ bank may be associated with a set of scoring rules that gives a high score for a nearly invisible security feature while giving a lower score for an obvious feature, such as a prominently displayed logo. This is because, for example, it may have been judged that it would be unlikely for a phisher to duplicate a nearly invisible and easily overlooked feature than to copy a highly visible logo. As another example, such a set of scoring rules for the login page for XYZ bank may give a particular score for a particular field of content, including for example the domain/port/query/string of a URL and/or the HTML/text string of a URL.

Generally speaking, any feature may be associated with a score, if desired, and the particular score associated with a feature may vary and may even be arbitrary. For example, the rule creator may arbitrarily decide that a particular misspelling is intentional, or a particular background characteristic that can be easily overlooked is intentional and the absence of that feature in a suspect web page may indicate that that the suspect web page is not similar to the target web page at issue.

Thus, when a suspect web page is compared against the login page for XYZ bank for the purpose of determining whether the suspect web page and the login page for XYZ bank is similar, the set of scoring rules associated with the login page for XYZ bank would be employed for scoring features found in the suspect web page. In this manner, if the suspect web page has a large number of features in common with the login page for XYZ bank and/or has in common certain high-scoring features, the suspect web page may earn a sufficiently high aggregate score to be deemed similar to the login page for XYZ bank.

The threshold for deciding whether an aggregate score earned by a suspect web page when that suspect web page is compared against the login page for XYZ bank may be implemented in the set of scoring rules for the login page of XYZ bank, for example. As with the determination of how many point a particular feature may be worth, the determination of the particular threshold value for deeming a suspect web page similar may be made empirically by a human or by automated software.

The point is each potential target web page (e.g., Acme Store credit card entry page) is associated with a set of scoring rules for its features, and that set of scoring rules are employed to generate a score for a suspect web page when that suspect web page is compared against Acme Store credit card entry page. Furthermore, the similarity threshold value to determine whether a suspect web page is similar to Acme Store credit card entry page is implemented by the set of scoring rules associated with the Acme Store credit card entry page.

When the suspect web page is compared against another potential target web page (e.g., ABC Bank personal information authentication page), the set of scoring rules associated with that potential target web page (e.g., ABC Bank personal information authentication page) would be employed instead to generate the similarity score. Further, the similarity threshold value to determine whether a suspect web page is similar to the ABC Bank personal information authentication page is implemented by the set of scoring rules associated with the ABC Bank personal information authentication page.

In this manner, it is possible for each web page or website owner to decide the importance place on each individual feature of his web page for the purpose of deciding whether another web page is sufficiently similar. In an embodiment, the score associated with each feature and/or the similarity threshold in the set of scoring rules for a particular web page may be continually refined and updated each time a "false positive" or an erroneous identification of similarity or dissimilarity occurs. For example, if the similarity threshold is so low that suspect web pages are often misidentified as being similar to a particular web page, the scoring rules may be revised and/or the similarity threshold in the set of scoring rules for that particular web page may be revised upward so that only suspect web pages that have a large number of features in common or having a sufficient number of high-scoring features in common would be judged to be similar.

As another example, if the similarity threshold is so high that no suspect web page is ever identified as being similar to a particular web page even though a suspect web page is the same as that particular web page (i.e., failing to identify that the two websites are similar), the scoring rules may be revised and/or the similarity threshold in the set of scoring rules for that particular web page may be revised downward so that web pages that are truly similar may be judged to be to be similar by the set of scoring rules for that particular web page. Since the set of scoring rules are associated with the legitimate web page, the effect of continually improving the scoring rules result in increasingly accurate similarity identification as more suspect web pages are tested against the legitimate web page.

In an embodiment, fuzzy logic or artificial intelligence may be employed to render the comparison process more efficient and/or accurate. In some embodiments, regular expressions for textual features may be employed in the evaluation of features and can achieve a good accuracy. In the context of the present application, a regular expression refers to a string that describes or matches a set of strings, according to certain syntax rules. Regular expressions are known to those skilled in the art and will not be explained in details herein. Using regular expressions in the creation of the set of scoring rules and in the scoring rules themselves increases the flexibility with which features in the suspect web pages may be identified and scored.

Figure 2:
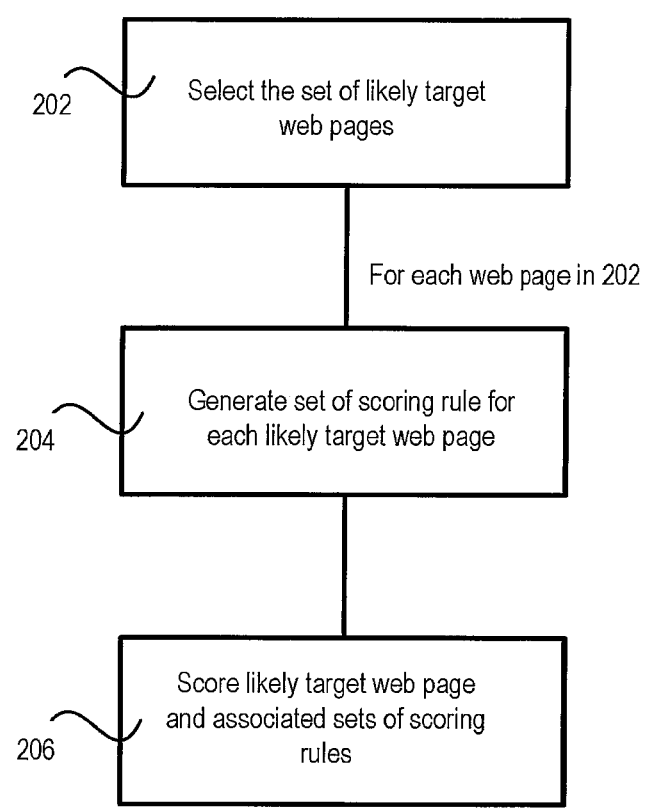
FIG. 2 shows, in accordance with an embodiment of the invention, the high level steps for preparing the set of likely target web pages for similarity comparison.

The features and advantages of the invention may be better understood with reference to the figures and discussions that follow. FIG. 2 shows, in accordance with an embodiment of the invention, the high level steps for preparing the set of likely target web pages for similarity comparison. In step 202, the set of likely target web pages are selected on the basis of website type and web page type. With respect to website type, websites that are popular and/or provide money, goods, or services tend to be sites that are targets for phishers and may thus be chosen in an embodiment.

With respect to web page type, web pages that request from users transaction information (including for example login information, any confidential and/or financial transaction information, etc.,) tend to be web pages that are targets of phishers and may thus be chosen, in an embodiment. In an embodiment, both the website type filter and web page type filter may be employed to select the set of likely target web pages. Alternatively or additionally, a human operator may select and add web pages to the set likely target web pages if it is believed that those web pages may be phishing targets. In these or other embodiments, web pages may also be included based on other criteria designed to select web pages deemed to be likely to be susceptible to phishing attacks In step 204. each of the likely target web page in the set of likely target web pages are processed to generate a set of scoring rules for features in that web page. As discussed, a feature may represent any attribute or characteristic of a web page, whether or not human or visually perceptible. In an embodiment, a human operator may manually designate the features worthy of scoring and the score associated with each of the web page features. In another embodiment, software may be employed to scan through a web page and/or the code implementing the web page and assign scores to some or all of the features found.

After each web page in the set of likely target web pages is processed, each web page and its set of scoring rules are stored (206) for subsequent use in similarity determination with a suspect web page.

Figure 3:
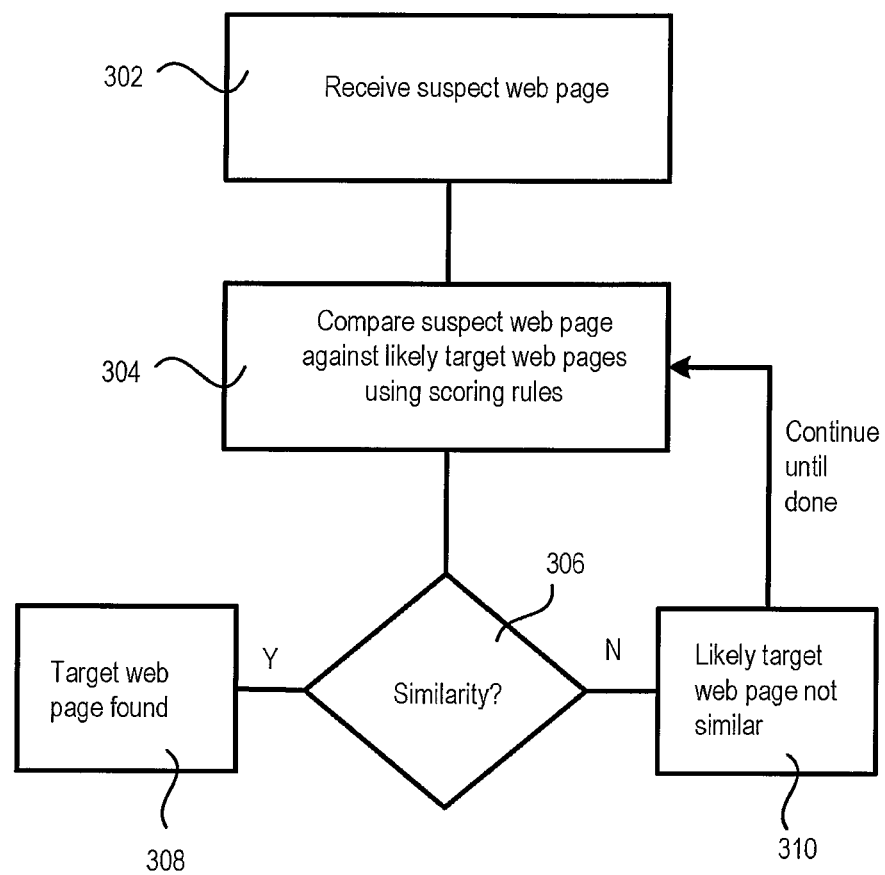
FIG. 3 shows, in accordance with an embodiment of the present invention, the steps for performing similarity analysis for a suspect web page.

FIG. 3 shows, in accordance with an embodiment of the present invention, the steps for performing similarity analysis for a suspect web page. In step 302, the suspect web page is received. In step 304, the suspect web page is compared against each likely target web page in the set of likely target web pages. In an embodiment, web pages in the set of likely target web pages may optionally be re-ordered based on information gleaned from the suspect web page such that those likely target web pages that have a highly probability of a similarity match are tested first. For example, if text or image in the suspect web page suggests that the suspect web page is a login web page for a particular enterprise, likely target login web pages for that particular enterprise may be tested first.

Generally speaking, the set of scoring rules for the likely target web page currently being tested is employed to score features found in the suspect web page. If the aggregate score exceeds (or equal to, in an embodiment) a certain similarity threshold (as determined by step 306), that likely target web page is identified as the web page that is similar to the suspect web page (308). Thereafter, analysis may be performed on the suspect web page to determine whether the suspect web page is indeed represents an attempt to perform a phishing attack on the identified similar target web page.

On the other hand, if the aggregate score is below (or equal to, in another embodiment) to the similarity threshold, that likely target web page is not identified as the web page that is similar to the suspect web page (310). Thereafter, comparison of the suspect web page against the likely target web pages continue until similarity is found.

In an embodiment, if a subsequent analysis ascertains that the similarity determination result from the steps of FIG. 3 is erroneous, changes may be made to the selection of features, the scoring of features, and/or the similarity threshold associated with the set of scoring rules for the target web page that was misidentified as being similar to the suspect web page. If all likely target web pages are exhausted and no similar web pages are found, a report is then provided, noting that a similar web page is not found among the set of likely target web pages. In this case, the similarity testing may proceed against additional web pages that were not included in the set of likely target web pages or the operator may be notified and the method of FIG. 3 may simply end after notification. In an embodiment, if more than one target web pages are determined to be similar to the suspect web page, no result will be drawn for this suspect web page, and the scoring rules may be revised iteratively to avoid this case. This embodiment is intended to minimize "false positives," as in the case wherein multiple web pages are determined to be similar and the result is thus inconclusive.

As can be appreciated from the foregoing, embodiments of the invention are able to ascertain the identity of the target web page in a highly efficient manner. By filtering the available web pages based on likely website types and likely web page types and further in view of the phishing problem to be solved, the set of likely target web pages may be made smaller. Since each likely target web page is associated with its own scoring rules, much flexibility is afforded to entities who own those likely target web pages in deciding whether the suspect web page is sufficiently similar. If an erroneous similarity determination is made, changes to the scoring rules and/or the similarity threshold may be made, enabling the similarity determination process to become more accurate over time.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A computer-implemented method for ascertaining which web page among a plurality of target web pages is similar to a suspect web page, comprising:
providing a plurality of sets of scoring rules, wherein each target web page of the plurality of target web pages has one set of said plurality of sets of scoring rules associated therewith;
extracting a set of web page components from said suspect web page;
comparing said suspect web page against each of said plurality of target web pages, said comparing resulting in a composite similarity score for each target web page of the plurality of target web pages; said composite similarity score being computed from scores assigned to individual ones of said set of web page components in accordance with the set of scoring rules associated with said target web page, wherein a web page component of said set of web page components is associated with a first score if said web page component also exists in said target web page, said web page component of said set of web page components is associated with a second score different from said first score assigned to said web page component if said web page component does not exist in said target web page; if said composite similarity score exceeds a predefined threshold implemented in the set of scoring rules, designating said suspect web page as being similar to said target web page, otherwise designating said suspect web page as being dissimilar to said target web page; and
when multiple target web pages of said plurality of target web pages are deemed similar to said suspect web page, revising iteratively the scoring rules for the multiple target web pages to avoid said multiple target web pages being deemed similar; and when said designation of said suspect web page as being dissimilar to the target web page is erroneous, revising the set of scoring rules associated with the target web page to avoid said erroneous designation.

2. The method of claim 1 wherein said set of web page components includes at least a URL string.

3. The method of claim 1 wherein said set of web page components includes an image element.

4. The method of claim 1 wherein said web page component represents text, and wherein web page component is tested for similarity using a regular expression.

5. The method of claim 1 wherein said web page component is visible.

6. The method of claim 1 wherein said web page component is invisible.

7. The method of claim 1 wherein said comparing is performed until a target web page of the plurality of target web pages is identified as a web page that is similar to the suspect web page with the composite similarity score exceeds or equal to a certain similarity threshold is found.

8. A computer-implemented method for designating a suspect web page similar or dissimilar with respect to a reference web page, comprising: generating a set of scoring rules associated with said reference web page by using software to scan through code implementing the reference web page; extracting a set of web page components from said suspect web page; computing, using the set of scoring rules associated with said reference web page, a composite similarity score for said set of web page components, said composite similarity score being computed from scores assigned to individual ones of said set of web page components, wherein a web page component of said set of web page components is assigned a first score if said web page component also exists in said reference web page, said web page component of said set of web page components is assigned a second score different from said first score assigned to said web page component if said web page component does not exist in said reference web page; if said composite similarity score exceeds a predefined threshold implemented in the set of scoring rules, designating said suspect web page as being similar to said reference web pages, otherwise designating said suspect web page as being dissimilar to said reference web page; receiving an indication that said designation of said suspect web page as being similar or dissimilar to the reference web page is erroneous; and revising the set of scoring rules associated with the reference web page to avoid said erroneous designation.

9. The method of claim 8 wherein said set of web page components includes at least a URL string.

10. The method of claim 8 wherein said set of web page components includes an image element.

11. The method of claim 8 wherein said web page component represents text, and wherein web page component is tested for similarity using a regular expression.

12. The method of claim 8 wherein said web page component is visible.

13. The method of claim 8 wherein said web page component is invisible.

14. An article of manufacture comprising a computer storage medium for storing thereon computer readable code for ascertaining which web page among a plurality of target web pages is similar to a suspect web page, comprising: computer readable code for providing a plurality of sets of scoring rules, wherein each target web page of the plurality of target web pages has one set of said plurality of sets of scoring rules associated therewith; computer readable code for extracting a set of web page components from said suspect web page; computer readable code for comparing said suspect web page against each of said plurality of target web pages in turn, said comparing resulting in a composite similarity score for each target web page of the plurality of target web pages; said composite similarity score being computed from scores assigned to individual ones of said set of web page components in accordance with the set of scoring rules associated with said target web page, wherein a web page component of said set of web page components is associated with a first score if said web page component also exists in said target web page, said web page component of said set of web page components is associated with a second score different from said first score assigned to said web page component if said web page component does not exist in said target web page; and computer readable code for designating, if said composite similarity score exceeds a predefined threshold implemented in the set of scoring rules, designating said suspect web page as being similar to said target web page, otherwise designating said suspect web page as being dissimilar to said target web page; and computer readable code for revising, upon receiving an indication that said designation of said suspect web page as being similar or dissimilar to said target web page is erroneous, the set of scoring rules associated with said target web page to avoid said erroneous designation.

15. The article of manufacture of claim 14 wherein said set of web page components includes at least a URL string.

16. The article of manufacture of claim 14 wherein said set of web page components includes an image element.

17. The article of manufacture of claim 14 wherein said web page component represents text, and wherein web page component is tested for similarity using a regular expression.

\* \* \* \* \*